(12) United States Patent
Galvin, Jr. et al.

(10) Patent No.: US 8,799,785 B2
(45) Date of Patent: Aug. 5, 2014

(54) ABILITY TO SCOPE AWARENESS TO YOUR CURRENT TASK

(75) Inventors: James Patrick Galvin, Jr., Oak Ridge, NC (US); Sandra L. Kogan, Newton, MA (US); Duncan L. Mewherter, Acton, MA (US); Ronald E. Pontrich, Jr., Lexington, KY (US); Kevin Solie, Lexington, KY (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1221 days.

(21) Appl. No.: 10/738,246

(22) Filed: Dec. 17, 2003

(65) Prior Publication Data

US 2005/0138108 A1    Jun. 23, 2005

(51) Int. Cl.
*G06F 3/00* (2006.01)

(52) U.S. Cl.
USPC ......................................... 715/747; 709/201

(58) Field of Classification Search
USPC .......................................................... 709/201
See application file for complete search history.

(56) References Cited

U.S. PATENT DOCUMENTS

| | | | | |
|---|---|---|---|---|
| 6,714,519 | B2 * | 3/2004 | Luzzatti et al. | 370/252 |
| 6,981,223 | B2 * | 12/2005 | Becker et al. | 715/753 |
| 6,993,327 | B2 * | 1/2006 | Mathis | 455/414.1 |
| 7,117,445 | B2 * | 10/2006 | Berger | 715/752 |
| 7,117,455 | B2 * | 10/2006 | Walker et al. | 716/2 |
| 7,184,524 | B2 * | 2/2007 | Digate et al. | 379/88.17 |
| 2005/0071506 | A1 * | 3/2005 | Hettish | 709/245 |
| 2006/0190525 | A1 * | 8/2006 | Bobde et al. | 709/202 |

* cited by examiner

*Primary Examiner* — Glenford Madamba
(74) *Attorney, Agent, or Firm* — Steven M. Greenberg, Esq.; CRGO Law

(57) ABSTRACT

A method and system for an awareness service is provided. One or more collaborative contexts can be set for a first user within a set of users using the awareness service. One or more subsets of users can be defined within the set of users corresponding to the one or more collaborative contexts, respectively. Furthermore, a level of availability can be defined for the first user with respect to each of the subset of users. Next, an online status can be published on the awareness service for the first user. The online status can display an availability message to a second user. And, the availability message can have the highest level of availability selected from a group consisting of every level of availability defined for the first user with respect to every subset of users that includes the second user.

6 Claims, 3 Drawing Sheets

ABILITY TO SCOPE AWARENESS TO YOUR CURRENT TASK

BACKGROUND OF THE INVENTION

1. Statement of the Technical Field

The present invention relates to the field of multi-user communications networks and more particularly to an awareness service for indicating the online status of users on the communications network.

2. Description of the Related Art

Networked communications systems have grown explosively in recent years. In many communications systems, such as instant messaging systems, an "awareness service" can be used, which is a system for displaying to a user the online status of other users logged into a network. Through an awareness service, a user can have a "buddy list" which, when activated, will display the online status of the other users defined in the buddy list. The user can then be "aware" of whether the other users are logged into the communications network, and can accordingly send messages or initiate other forms of communication with the other users. Awareness services can also be used with systems that share documents through document repositories, where a user can peruse the system for a document, and can immediately check whether the author of a particular document is online.

However, when a particular user is logged into an awareness service, the online status for the user is delivered to all interested recipients in exactly the same way irrespective of context or of any relationship between the users. For example, the awareness service may simply display, for a particular user, an availability message of "Available" to all parties subscribed to the service, once the user has logged on to the service. However, a user may wish to specify a different online status to different parties subscribing to the awareness service. A user could be in a meeting, such as an electronic meeting, and may wish, for example, to display an availability message of "Do Not Disturb" to other users of the awareness service not in the same meeting, while displaying an alternate availability message of "Available" to users which are also in the same meeting.

Current awareness services do not have the ability to set a different online status for a user with respect to varying groups of other users connected or subscribed to the awareness service. A user cannot therefore, publish varying online status messages to other users, based on any context, such as a collaborative context between the user and some group of other users.

It would be desirable therefore, to provide an awareness service where a user could publish a varying online status. It would further be desirable to provide an awareness service where the online status could depend on a collaborative context between the user and a group of other users subscribed to the awareness service, where the user could set and determine the collaborative context.

SUMMARY OF THE INVENTION

The present invention addresses the deficiencies of the art with respect to an awareness service for multiple users over a communications network, and provides a novel and non-obvious awareness service which provides a user with the ability to publish a variable online status to groups of other users defined by the user.

Methods consistent with the present invention provide a method of administering an awareness service. One or more collaborative contexts can be set for a first user within a set of users. One or more subsets of users can be defined within the set of users corresponding to the one or more collaborative contexts, respectively. Furthermore, a level of availability can be defined for the first user with respect to each of the subset of users. Next, an online status can be published on the awareness service for the first user. The online status can display an availability message to a second user. And, the availability message can have the highest level of availability selected from a group consisting of every level of availability defined for the first user with respect to every subset of users which includes the second user.

Another embodiment of the present invention provides a method of executing an awareness service having a set of users. A first collaborative context can be set for a first user within the set of users. The first collaborative context can define a first subset of users within the set of users. Next, a first online status can be publishing on the awareness service for the first user. The first online status displays a first availability message to the first subset of users, and a second availability message to users not within the first subset of users.

Systems consistent with the present invention include a system for administering an awareness service for a set of users on a network. The system includes an awareness processor configured for defining one or more subsets of users within the set of users. The one or more subsets of users correspond to one or more collaborative contexts set by a first user within the set of users. The awareness processor is further configured to define a level of availability for the first user with respect to each subset of users. In addition, the awareness processor is configured to publish an online status for the first user. The online status displays an availability message to a second user having the highest level of availability selected from a group consisting of every level of availability defined for the second user in every subset of users which includes the second user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a novel and non-obvious method and system for administering an awareness service. As used herein, an "awareness service" can be any system, to which users can connect or subscribe, which provides an indication of the online status of one or more entities connected through a common communications network. The awareness service of the present invention allows a user to set one or more collaborative contexts which define corresponding groups of users on a network. Each collaborative context can also define a level of availability for the user with respect to each of the defined groups of users. The user can then publish an online status on the network, whereupon the awareness service can display an availability message to each of the defined groups of users, each message having the user-defined level of availability for the group.

Figure 1:
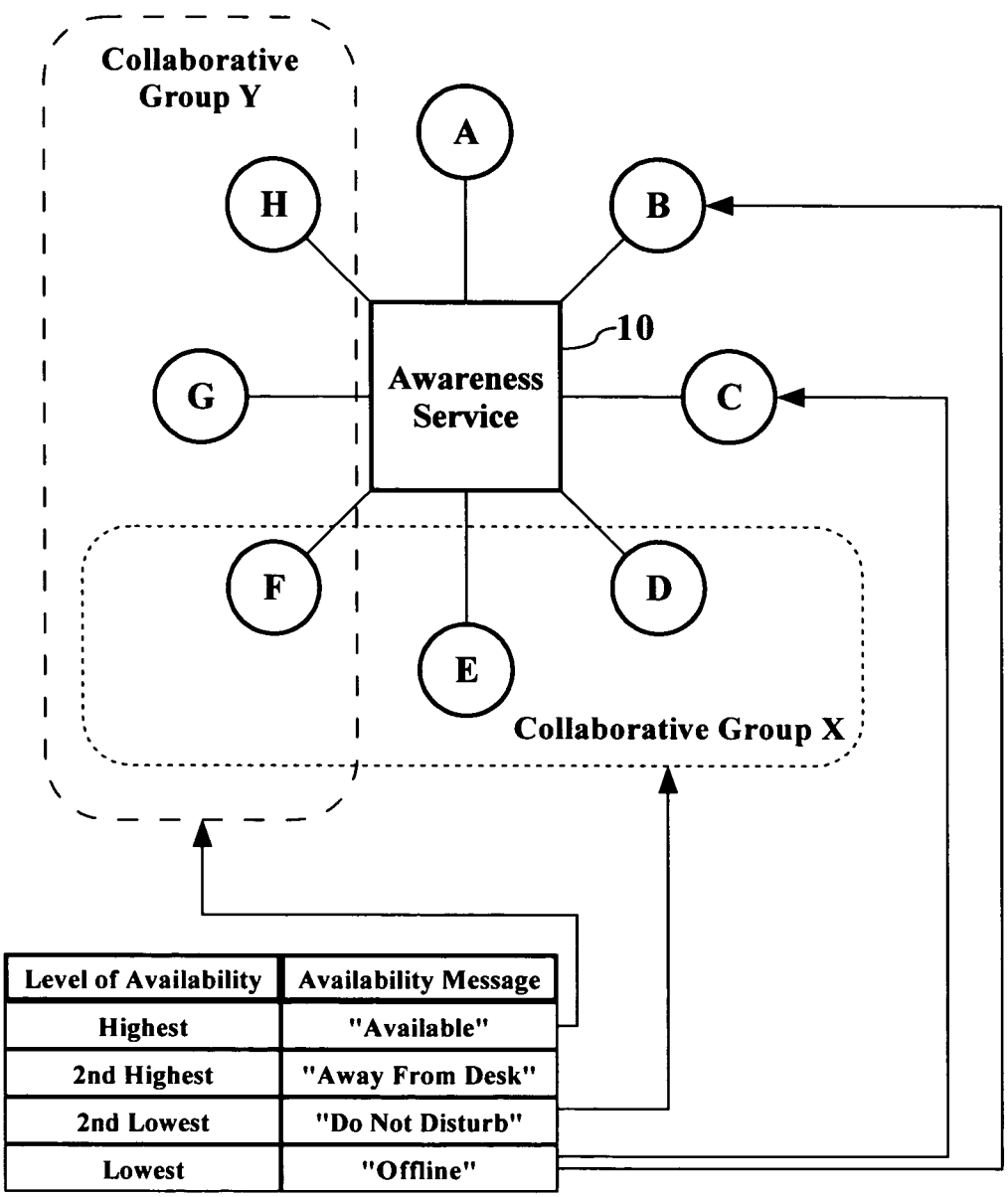
FIG. 1 is a conceptual illustration of one or more collaborative groups defined for a number of users subscribed to an awareness service in accordance with the principles of the present invention.

FIG. 1 is a conceptual illustration of one or more collaborative groups defined for a number of users subscribed to an awareness service in accordance with the principles of the present invention. Users A through H are connected to the awareness service 10 through some network. The awareness service 10 can be implemented in any number of systems, over the internet, for any instant messaging system, or any other system which utilizes the functionality of an awareness service as defined herein. The present invention allows a user to define one or more groups of users, to which different availability messages can be published through the awareness service 10.

The present invention accomplishes this by allowing a user to set one or more "collaborative contexts" with the awareness service 10. A collaborative context is defined herein as a relationship between the user and any amalgamation of users connected to the awareness service. The user on awareness service 10 can associate herself with any number of other users, including herself, through the collaborative context. The context could be for any purpose: a long-term project, an e-meeting, an online learning course, or even a system-wide context, i.e. for all users connected to the awareness service 10.

For example, in FIG. 1, user A could set a first collaborative context which defines the subset of users including users D, E, and F, this being "Collaborative Group X." User A could also set a second collaborative context which defines the subset of users including users F, G, and H, this being "Collaborative Group Y." Collaborative Group X could be a persistent group, such as a group in a directory, a TeamSpace, or simply a group of users that are linked to perform a common long-term task or project. Collaborative Group Y could be a transient grouping, such as for users participating in an electronic meeting.

A user can also define a level of availability for each group defined by a collaborative context. A "level of availability" can be any one of a number of discrete, hierarchical "states" of availability for the user. Each level of availability is therefore either higher or lower than every other level of availability, and can have an "availability message" associated with it, such as a text message. Examples of such availability messages can include "available", "away from desk", "do not disturb", or "offline", which are ordered by descending level of availability.

For example, for Group X, user A could choose a level of availability having the availability message of "do not disturb", while for Group Y, the level of availability could have the availability message of "available." When the awareness service 10 publishes the online status of user A, it displays the message of "do not disturb" to all users in Group X, and the message of "available" to all users in Group Y. In the case of User F, who is included in both Groups X and Y, the awareness service can select the highest level of availability defined for the user, this being the level having the message "available." In displaying the online status of user A, the awareness service 10 can also default to choose the lowest level of availability for any other user not included in a group defined by a collaborative context, such as showing the message of "offline" to user B and user C.

User A can publish her online status several times, and can change any collaborative context with each publication. Each time the collaborative context is changed, a new group of users can be defined, and a new level of availability and associated availability message can be set for the group.

Figure 2:
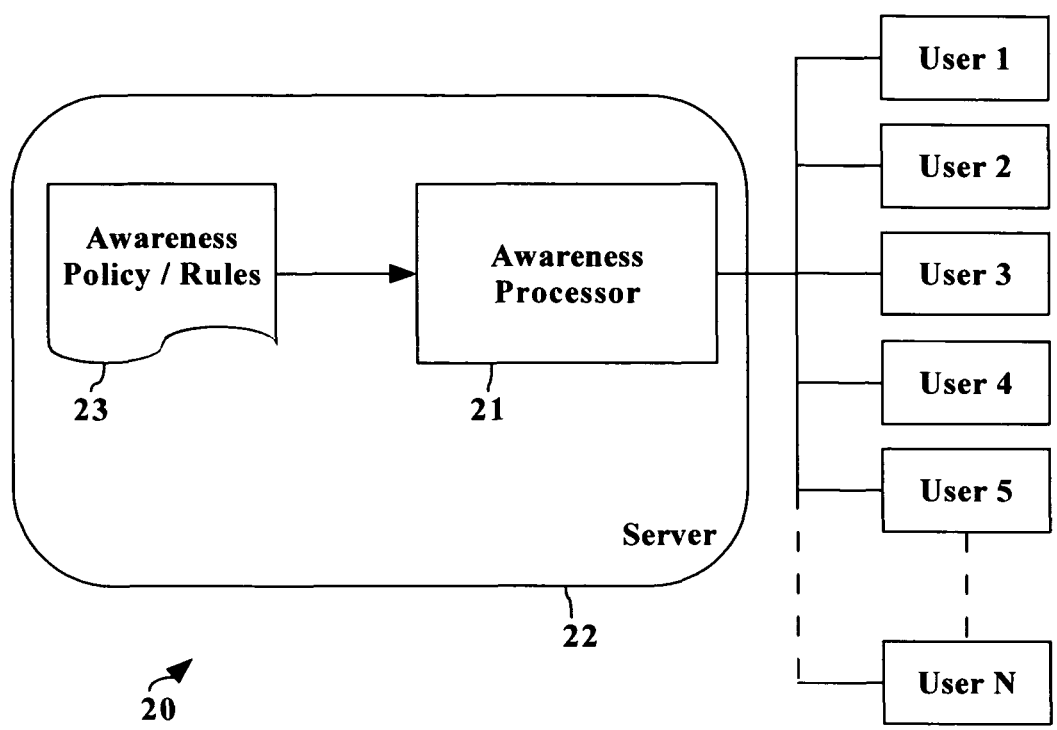
FIG. 2 is one embodiment of a system having an awareness policy for administering an awareness service between a set of users.

FIG. 2 is one embodiment of a system having an awareness policy for administering an awareness service between a set of users. The system 20 can include an awareness processor 21 on a server 22. The processor 23 executes an awareness policy 23 which can contain the rules for the awareness service of the present invention, as set forth above. Users 1 through N can be connected to the server 22 and processor 21, and can set various collaborative contexts. The awareness processor 21 can set the collaborative contexts, define the subsets of users associated with each context, and publish the online status of any user, displaying the appropriate availability message to each user defined in a particular subset by a collaborative group.

Figure 3:
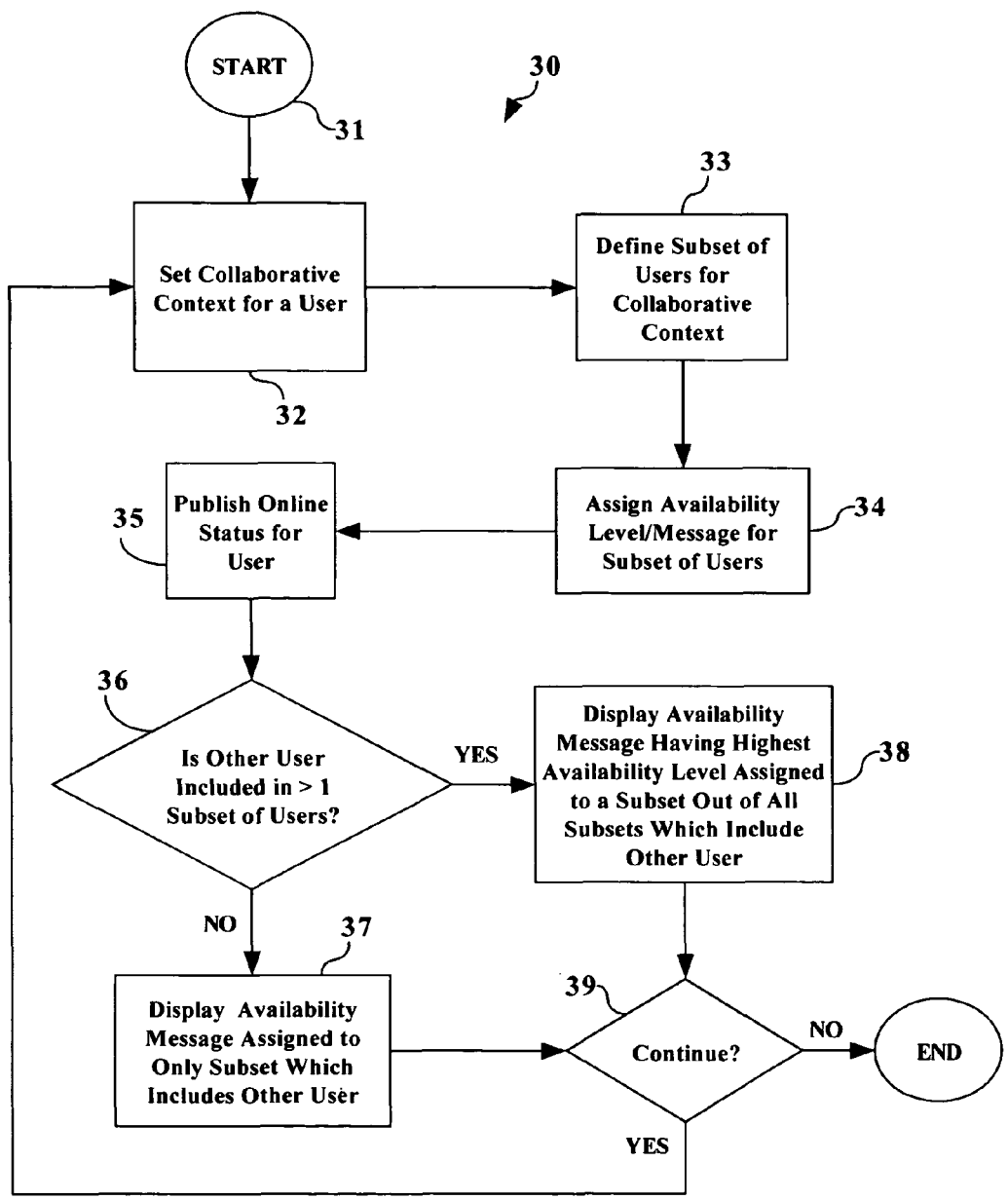
FIG. 3 is a flowchart illustrating a process of administering an awareness service for a set of users in accordance with the principles of the present invention.

FIG. 3 is a flowchart illustrating a process of administering an awareness service for a set of users in accordance with the principles of the present invention. After starting at step 31, a user can set a collaborative context in step 32. The collaborative context can define a subset of users in step 33, and a level of availability and associated availability message can be assigned to the subset in step 34. Next, the awareness service can publish the online status of the user in step 35, thereby displaying an availability message to every other user of the service.

Since the process is repeatable, collaborative contexts could have been previously set, defining various subsets of users, and assigning various availability levels and messages to the other users on the system in those subsets. Therefore, the awareness service first must determine in step 36 whether each other user is included in greater than one defined subset of users. If a user included in no more than one subset, in step 37 the awareness service displays the availability message assigned to the sole subset of users that includes the user. Otherwise the awareness service proceeds to step 38, and displays the availability message having the highest level of availability assigned to any subset out of all subsets that include the other user.

After checking whether to continue in step 39, the process can either end, or return to step 32, where a new collaborative context can be set. Alternatively, the user could proceed through step 33 without changing the defined subset of users for the collaborative context, but simply change the level of availability assigned to the subset.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for scoping awareness to a collaborative task, the method comprising:
    establishing different collaborative contexts in a collaborative computing system, each of the collaborative contexts comprising a subset of users in the collaborative computing system and an arrangement of tasks to be performed amongst the subset of users;
    setting different availability messages for each of the different collaborative contexts, one of the different availability messages defines a first level of availability, and another of the different availability messages defines a second level of availability, the first level of availability being higher than the second level of availability;
    determining whether a user is assigned to multiple, different subsets of users and if so, identifying, based upon the different availability messages, a highest availability level online status assigned to one of the multiple, different subsets of users to which the user is determined to have been assigned; and,
    publishing the identified highest availability level online status for the user amongst the users to others of the users if it is determined that the user is assigned to multiple, different subsets of users, but otherwise, publishing an online status for the user amongst the users to others of the users for the user determined not to be assigned to multiple, different subsets of users, the online status varying for each of the other users depending upon a membership of each other of the users in a particular one of the collaborative contexts.

2. The method of claim 1, further comprising:
    setting a second collaborative context for a first user within a set of users, the second collaborative context defining a second subset of users within the set of users; and,
    publishing a second online status for the first user, the second online status displaying an availability message to any user within both the second subset of users and the first subset of users, and displaying a different availability message to any user within the second subset of users but not within the first subset of users.

3. A system for scoping awareness to a collaborative task, comprising:
    a server including memory; and,
    an awareness processor executing in the memory of the server, the awareness processor enabled to
        establish different collaborative contexts in a collaborative computing system, each of the collaborative contexts comprising a subset of users in the collaborative computing system and an arrangement of tasks to be performed amongst the subset of users,
        set different availability messages for each of the different collaborative contexts, one of the different availability messages defines a first level of availability, and another of the different availability messages defines a second level of availability, the first level of availability being higher than the second level of availability,
        determine whether a user is assigned to multiple, different subsets of users and if so, identifying, based upon the different availability messages, a highest availability level online status assigned to one of the multiple, different subsets of users to which the user is determined to have been assigned, and
        publish the identified highest availability level online status for the user amongst the users to others of the users if it is determined that the user is assigned to multiple, different subsets of users, but otherwise, publishing an online status for the user amongst the users to others of the users for the user determined not to be assigned to multiple, different subsets of users, the online status varying for each of the other users depending upon a membership of each other of the users in a particular one of the collaborative contexts.

4. The system of claim 3, wherein the awareness processor is further enabled to:
    set a second collaborative context for a first user within a set of users, the second collaborative context defining a second subset of users within the set of users; and,
    publish a second online status for the first user, the second online status displaying an availability message to any user within both the second subset of users and the first subset of users, and displaying a different availability message to any user within the second subset of users but not within the first subset of users.

5. A computer program product for scoping awareness to a collaborative task, the computer program product comprising:
    a machine readable storage device having computer readable program code embodied therewith, the computer readable program code comprising:
    computer readable program code for establishing different collaborative contexts in a collaborative computing system, each of the collaborative contexts comprising a subset of users in the collaborative computing system and an arrangement of tasks to be performed amongst the subset of users;
    computer readable program code for setting different availability messages for each of the different collaborative contexts, one of the different availability messages defines a first level of availability, and another of the different availability messages defines a second level of availability, the first level of availability being higher than the second level of availability;
    computer readable program code for determining whether a user is assigned to multiple, different subsets of users and if so, identifying, based upon the different availability messages, a highest availability level online status assigned to one of the multiple, different subsets of users to which the user is determined to have been assigned; and,
    computer readable program code for publishing the identified highest availability level online status for the user amongst the users to others of the users if it is determined that the user is assigned to multiple, different subsets of users, but otherwise, publishing an online status for the user amongst the users to others of the users for the user determined not to be assigned to multiple, different subsets of users, the online status varying for each of the other users depending upon a membership of each other of the users in a particular one of the collaborative contexts.

6. The computer program product of claim 5, wherein the computer readable program code further comprises:

computer readable program code for setting a second collaborative context for a first user within a set of users, the second collaborative context defining a second subset of users within the set of users; and, computer readable program code for publishing a second online status for the first user, the second online status displaying an availability message to any user within both the second subset of users and the first subset of users, and displaying a different availability message to any user within the second subset of users but not within the first subset of users.

\* \* \* \* \*